(12) United States Patent
Madrahalli et al.

(10) Patent No.: US 8,619,553 B2
(45) Date of Patent: Dec. 31, 2013

(54) METHODS AND SYSTEMS FOR MESH RESTORATION BASED ON ASSOCIATED HOP DESIGNATED TRANSIT LISTS

(75) Inventors: Vagish Madrahalli, Woodstock, GA (US); Alessandro Fabbri, Roswell, GA (US); John Oltman, Chamblee, GA (US)

(73) Assignee: Ciena Corporation, Hanover, MD (US)

( * ) Notice: Subject to any disclaimer, the term of this patent is extended or adjusted under 35 U.S.C. 154(b) by 562 days.

(21) Appl. No.: 12/350,556

(22) Filed: Jan. 8, 2009

(65) Prior Publication Data

US 2010/0172236 A1 Jul. 8, 2010

(51) Int. Cl.
*G01R 31/08* (2006.01)
(52) U.S. Cl.
USPC ............................ 370/225; 370/216; 370/228
(58) Field of Classification Search
USPC .......................... 370/216, 217, 218, 228, 225
See application file for complete search history.

(56) References Cited

U.S. PATENT DOCUMENTS

| | | | |
|---|---|---|---|
| 6,392,989 B1* | 5/2002 | Jardetzky et al. | 370/216 |
| 7,324,453 B2* | 1/2008 | Wu et al. | 370/238 |
| 2002/0131424 A1* | 9/2002 | Suemura | 370/400 |
| 2003/0067867 A1* | 4/2003 | Weis | 370/210 |

* cited by examiner

*Primary Examiner* — Omer Mian
(74) *Attorney, Agent, or Firm* — Clements Bernard PLLC; Christopher L. Bernard; Lawrence A. Baratta, Jr.

(57) ABSTRACT

The present disclosure provides systems and methods for mesh restoration based on Associated Hop Designated Transit Lists (DTLs). The Associated Hop DTLs are calculated through a global restoration calculation (GRC) algorithm that can be run by a central controller in an offline manner. The restoration paths calculated by the GRC algorithm can then be pushed down to the originating nodes for each connection to utilize at the time of a given failure scenario. This GRC algorithm can be performed for each possible bundle failure in the network, where a bundle failure is determined by the set of all links which may fail together due to common shared risk, such as a common conduit or DWDM fiber. The globally calculated, contention free, restoration paths are then pushed down to each node in the network.

12 Claims, 10 Drawing Sheets

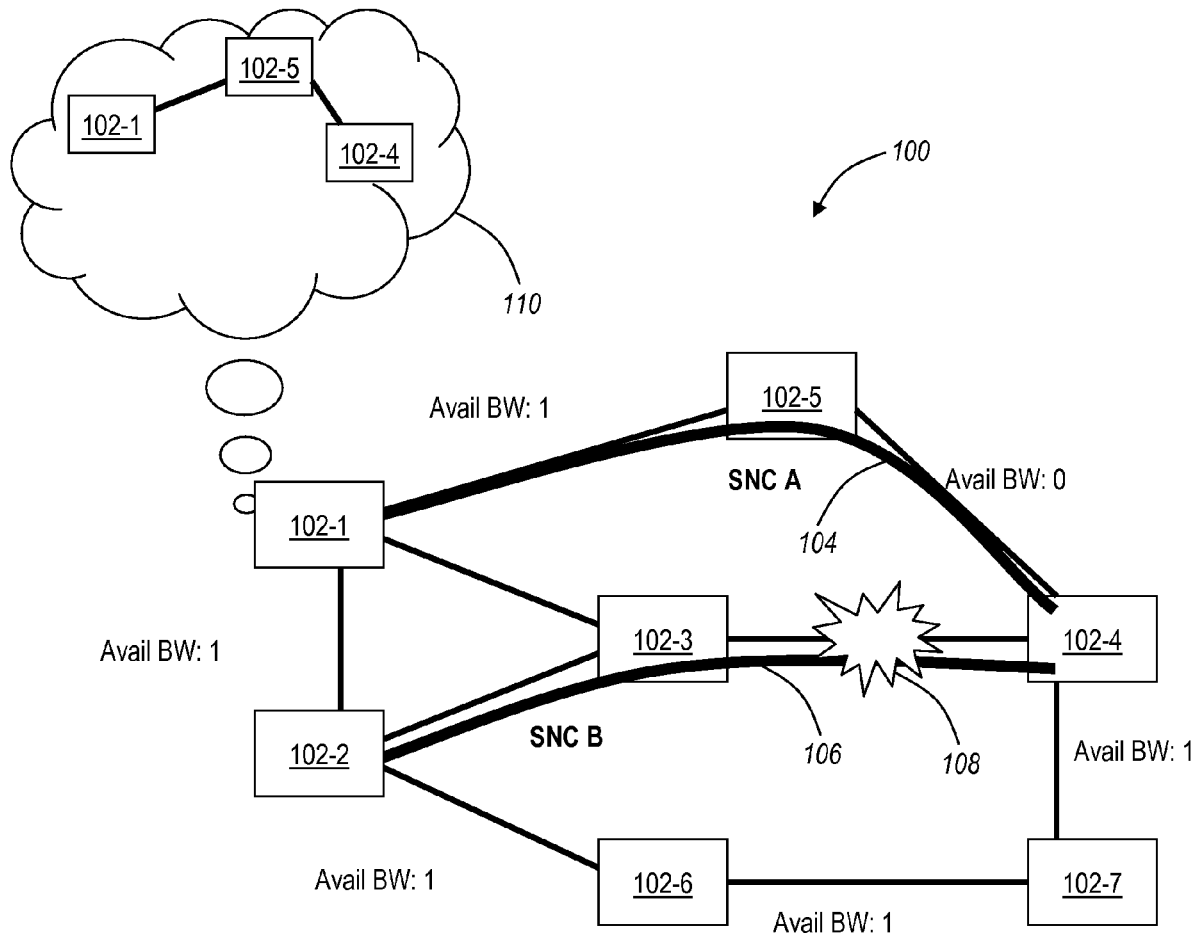
FIG. 1b *Prior Art*

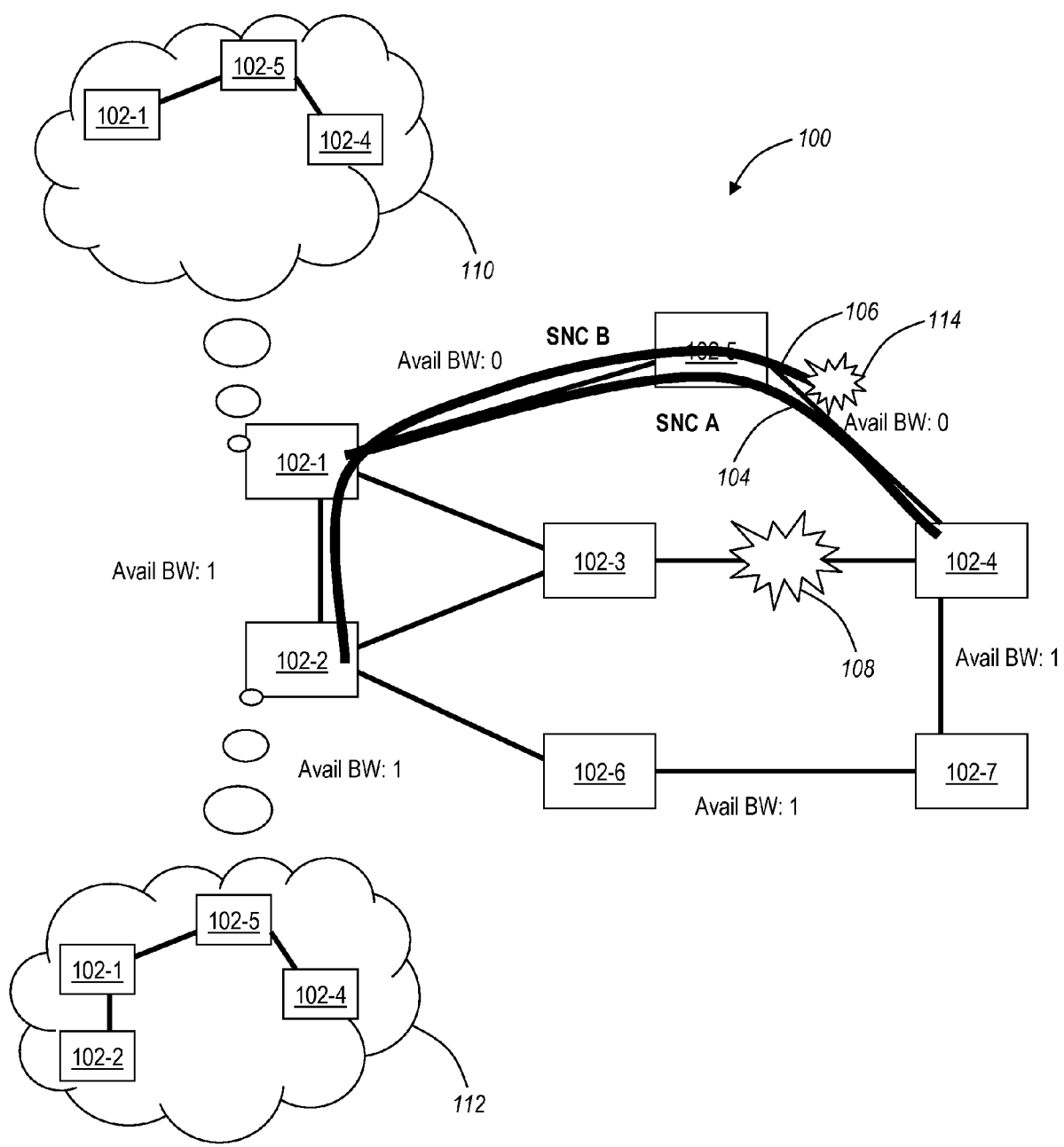
*FIG. 1c*  *Prior Art*

METHODS AND SYSTEMS FOR MESH RESTORATION BASED ON ASSOCIATED HOP DESIGNATED TRANSIT LISTS

FIELD OF THE INVENTION

The present invention relates generally to communication networks. More particularly, the present invention provides systems and methods for mesh restoration in networks based on Associated Hop Designated Transit Lists (DTLs) which include unique DTLs that are provided for each link that a given connection traverses from origination to termination node based on a global restoration pre-calculation.

BACKGROUND OF THE INVENTION

Conventionally, various communication networks (e.g., optical networks) utilize various mechanisms to provide mesh switching, such as Optical Signal and Routing Protocol (OSRP), Automatically Switched Optical Network (ASON), Generalized Multi-Protocol Label Switching (GMPLS), and the like. In mesh switching networks, each node is aware of its own set of connections and the network topology (i.e., network elements and links), including the available bandwidth on each link, link admin weight or cost, and the physical diversity of links based on shared risk link group information. Based on this information, the node is able to calculate least cost restoration paths in the network which are diverse from the current route of a given connection. These restoration paths can either be computed in direct response to a failure event or pre-calculated in advance of the failure. In both cases, the calculated restoration path attempts to utilize network bandwidth that is both link and bundle diverse from the failed/current working path. These restoration paths may also be user-specified preferred or exclusive paths that the connection can take during failure or a mesh restoration event. Such paths are specified through the assignment of a designated transit list (DTL). One or more such restoration paths may be specified in a DTL set.

Conventional mechanisms suffer from the problem that an individual node does not have a global view of all the connections in the network. The node is fully aware of all connections that it originates and is responsible for calculating restoration paths for these connections. Each node in the network performs this calculation independently and multiple nodes may calculate a common restoration path for circuits affected by a given failure. In such a case, the bandwidth on this restoration path may become oversubscribed. At the time of failure, the first connections to attempt restoration on this route get the bandwidth on a first come, first serve basis. Additional connections which reflect the degree of oversubscription encounter crankback and the originating nodes are forced to calculate alternate restoration paths. As restoration events become larger, this process of bandwidth contention can recur through multiple iterations before all connections are fully restored. This process can lead to longer restoration times and increased signaling traffic in the network. The increase in signaling traffic can further delay the ability for routing messages to be propagated through the network. The routing messages are necessary to fully inform the originating nodes of affected connections on the actual bandwidth utilization of links in the network. Latency in the ability or routing updates to propagate through the network can further cause crankback to occur as connection attempts continue to be tried on links for which bandwidth is not available.

Another issue is that to ensure protection routes are valid at the time of failure, they must be calculated such that they are bundle diverse from all possible failures along the route of the connection. A failure may occur at any point along the route of a connection which can include multiple hops. Each hop is represented by a single link, but that link can further be part of a bundle of links that has a probability of simultaneous failure. For example, one link can be represented by a single wavelength in a dense wave division multiplexed (DWDM) span or a single fiber within a common conduit. In addition to the links which the connection actually traverses, any of the links which share a common shared risk or bundle identification must be excluded from possible restoration paths at the moment of failure. This can remove a significant amount of potentially available restoration bandwidth from the network on the probability that it is failed. At the time of failure, routing updates on the exact state of the network have not had an opportunity to propagate and potentially failed bandwidth is removed from consideration in an effort to speed restoration times by avoiding crankback. This can result in a higher cost path being selected for restoration than what might be available. It also can limit the number of available paths in the network to a smaller pool of diverse bandwidth which is more likely to become oversubscribed.

In conventional implementations, a DTL set can contain more than one restoration paths, but they are utilized as a hierarchy of choices. The same hierarchy is used regardless of which link in the end-to-end connection may fail. Such DTLs can be used to steer restoration away from oversubscribing bandwidth, but in a global restoration calculation, they must be assigned based the sum of all hops a given connection traverses and not focused to the actual link which may have failed. This can be used to the lower the probability of bandwidth oversubscription, but does not have the ability to eliminate it.

BRIEF SUMMARY OF THE INVENTION

In various exemplary embodiments, the present invention provides systems and methods for mesh restoration based on Associated Hop Designated Transit Lists (DTLs). The Associated Hop DTLs are calculated through a global restoration calculation (GRC) algorithm that can be run by a central controller in an offline manner. The restoration paths calculated by the GRC algorithm can then be pushed down to the originating nodes for each connection to utilize at the time of a given failure scenario. This GRC algorithm can be performed for each possible bundle failure in the network, where a bundle failure is determined by the set of all links which may fail together due to common shared risk, such as a common conduit or DWDM fiber. The globally calculated, contention free, restoration paths are then pushed down to each node in the network.

In an exemplary embodiment of the present invention, a mesh restoration method utilizing globally pre-computed Associated Hop Designated Transit Lists includes selecting a target link from a plurality of links in a network; statistically modeling failures on the target link and all partner links of the plurality of links with a common protection bundle identification as the target link, wherein the failures affect a plurality of sub-network connections; routing the affected plurality of sub-network connections based upon the failures; and determining pre-computed paths based on the failures for each of the affected plurality of sub-network connections. The mesh restoration method can further include defining Associated Hop Designated Transit Lists based on the determined pre-computed paths. The mesh restoration method can also further include providing the Associated Hop Designated Transit Lists to each originating node for each of the affected plurality of sub-network connections. The routing step can include for all affected sub-network connections that have a Designated Transit List associated to one or more of the partner links, routing the affected sub-network connections on the Designated Transit List associated to one or more of the partner links; and for all remaining sub-network connections, finding a new route using any unused bandwidth in the network. Optionally, the mesh restoration method further includes repeating the selecting, statistically modeling, routing, and determining steps for each of the plurality of links. The repeating step can provide an initial baseline; and the method can further include updating the initial baseline periodically; and repeating the selecting, statistically modeling, routing, and determining steps responsive to provisioning or failure events on one or more of the plurality of links. Alternatively, the mesh restoration method further includes performing a second phase of the selecting, statistically modeling, routing, and determining steps for each of the plurality of links to try and route any unrouted sub-network connections. The mesh restoration method can further include receiving updates from a plurality of nodes in the network with a signal and routing protocol; wherein the updates are utilized in the selecting, statistically modeling, routing, and determining steps. Optionally, the mesh restoration method further includes partitioning the network into a plurality of sectors including each of the plurality of links; and repeating the selecting, statistically modeling, routing, and determining steps for each of the plurality of links in parallel based on the plurality of sectors.

In another exemplary embodiment of the present invention, a mesh network utilizing globally pre-computed Associated Hop Designated Transit Lists includes one or more originating nodes; one or more terminating nodes interconnected to the one or more originating nodes through a plurality of links; and a controller in communication with each of the one or more originating nodes and the one or more terminating nodes; wherein the controller is configured to: statistically model failures on a selected link of the plurality of links and all partner links of the plurality of links with a common protection bundle identification as the selected link, wherein the statistically model failures affect a plurality of sub-network connections; and to determine pre-computed globally correlated restoration paths based on the statistically model failures for each of the affected plurality of sub-network connections. Optionally, the mesh network further includes means for updating the one or more originating nodes with the pre-computed globally correlated restoration paths. To determine pre-computed globally correlated restoration paths includes for all affected sub-network connections that have a Designated Transit List associated to one or more of the partner links, routing the affected sub-network connections on the Designated Transit List associated to one or more of the partner links; and for all remaining sub-network connections, finding a new route using any unused bandwidth in the network. The controller can continuously determine the pre-computed globally correlated restoration paths at one of periodically, based on provisioning, and failure events. Optionally, the controller is further configured to receive updates from the one or more originating nodes and the one or more terminating nodes. Alternatively, the controller is further configured to determine pre-computed globally correlated restoration paths in a parallel computation.

In yet another exemplary embodiment of the present invention, a management system for a mesh network includes a data store; memory; a processor; a network interface communication to one or more nodes in the mesh network; and a local interface communicatively coupling each of the data store, the memory, the processor and the network interface; wherein the processor is configured to: receive updates associated with a plurality of links and bandwidth in the mesh network; statistically model failures on a selected link of the plurality of links and all partner links of the plurality of links with a common protection bundle identification as the selected link, wherein the statistically model failures affect a plurality of sub-network connections; and determine pre-computed globally correlated restoration paths based on the statistically model failures for each of the affected plurality of sub-network connections. The processor is further configured to update one or more originating nodes with the pre-computed globally correlated restoration paths. Optionally, the processor continuously determines the pre-computed globally correlated restoration paths at one of periodically, based on provisioning, and failure events. Alternatively, the processor is further configured to determine pre-computed globally correlated restoration paths in a parallel computation. The management system can include one of an element management system and a network management system configured to provide operations, maintenance, administration, and provisioning of the mesh network.

BRIEF DESCRIPTION OF THE DRAWINGS

The present invention is illustrated and described herein with reference to the various drawings, in which like reference numbers denote like method steps and/or system components, respectively, and in which:

FIGS. 1a-1d illustrate a network of a plurality of interconnected nodes showing Sub-Network Connection (SNC) churn in conventional mesh network;

DETAILED DESCRIPTION OF THE INVENTION

Figure 1A:
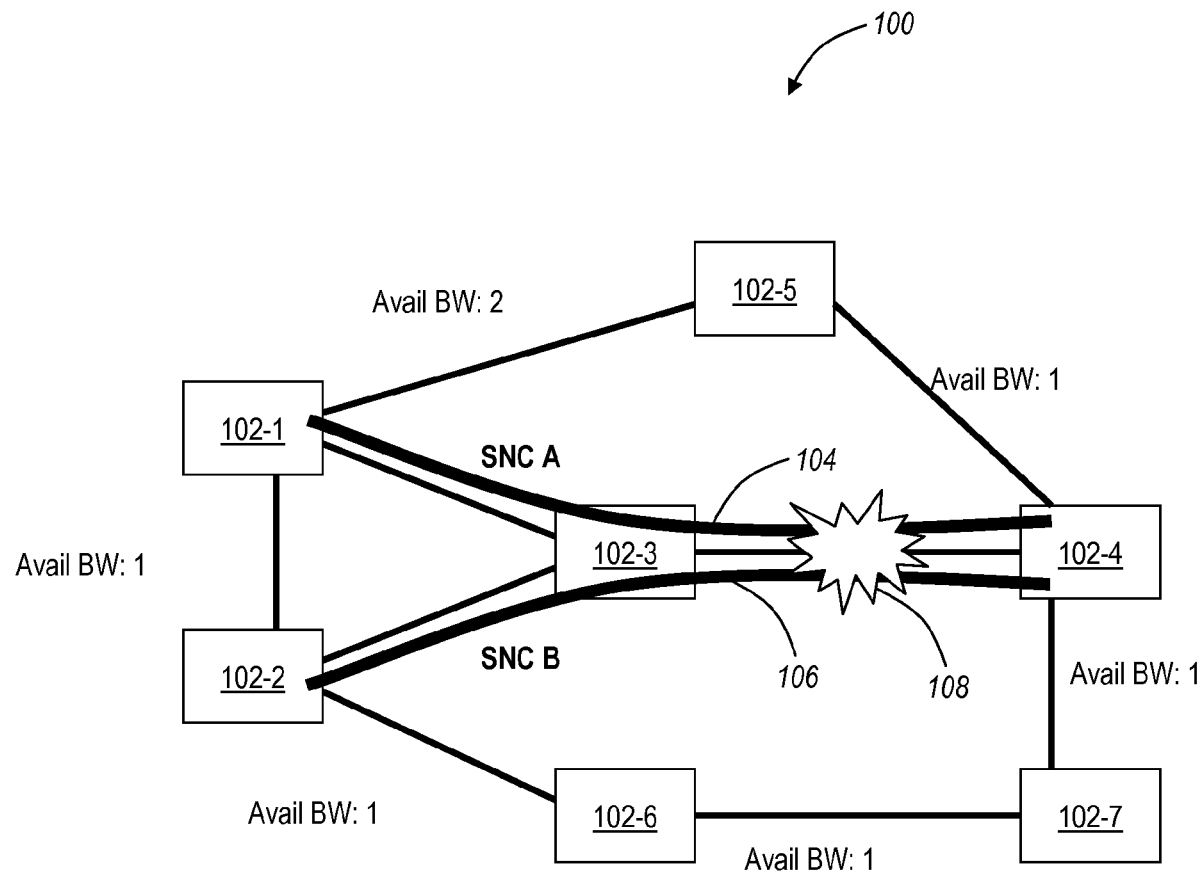
Figure 1D:
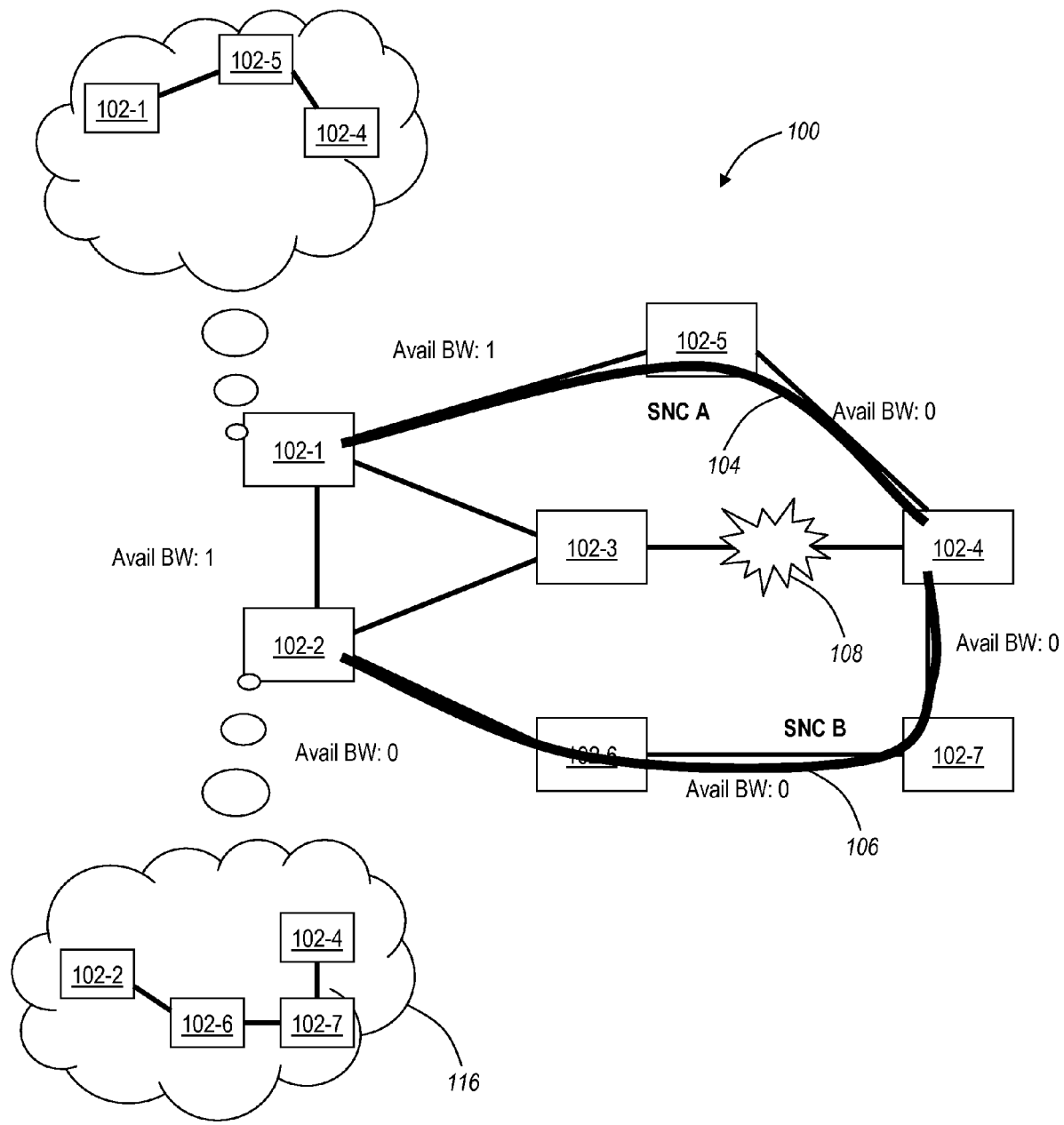

In various exemplary embodiments, the present invention provides systems and methods for mesh restoration based on Associated Hop Designated Transit Lists (DTLs). In order to address the issue of bandwidth oversubscription of restoration capacity in a mesh network, ideally every node in the network could model a failure of any given link and calculate a contention-free restoration path for all circuits affected by the given failure. However, such mechanisms are computationally intensive and cannot practically be performed in real-time at the time of failure. It further requires a coordinated calculation across all nodes in the network which requires significant messaging between the nodes to perform the calculation. These mechanisms further require knowledge of all connections in the network, something a given node is not aware of. For example, a given node is aware that it has originated connections which traverse a given link, but it not aware of which other nodes in the network may have also originated connections which also currently traverse the same link.

The present invention includes a global restoration calculation (GRC) algorithm that can be run by a central controller in an offline manner. The restoration paths calculated by the GRC algorithm can then be pushed down to the originating nodes for each connection to utilize at the time of a given failure scenario. This GRC algorithm can be performed for each possible bundle failure in the network, where a bundle failure is determined by the set of all links which may fail together due to common shared risk, such as a common conduit or DWDM fiber. The globally calculated, contention-free, restoration paths are then pushed down to each node in the network.

The restoration paths can be assigned to each connection in the form of a DTL. A unique DTL can be provided for each link that a given connection traverses from origination to termination node. Such a DTL set is referred to as an Associated Hop DTL set and the individual DTLs within the set are referred to as Per Hop DTLs. Each Per Hop DTLs for a given connection is further associated to a specific link in the network. In the event of a link failure, connection release messages are sent to the originating node. These release messages include the identification (ID) of the failed link which the originating node can then use to "look up" the associated restoration path within a given connection's Associated Hop DTL set.

Advantageously, where all connections have valid and up-to-date Hop Associated DTL sets, crankback can be eliminated from the network, reducing restoration time, minimizing signaling, and improving the propagation time of routing updates. Additionally, further benefit is provided in that restoration routes are calculated that are only bundle diverse from the failed link as opposed to attempting to be bundle diverse from all of the links traversed in a given connection. This results in the potential for lower cost paths to be utilized and for a greater amount of restoration bandwidth to be considered available at the time of restoration.

Referring to FIGS. 1a-1d, a network 100 of a plurality of interconnected nodes 102 illustrates Sub-Network Connection (SNC) churn in conventional mesh networks. The network 100 includes a signaling and routing protocol, such as OSRP, ASON, GMPLS, or the like, operating between each of the interconnected nodes 102. The signaling and routing protocol provides for automatic resource discovery, distribution of network resource information, and establishment and restoration of connections dynamically across the network 100. Each of the interconnected nodes 102 can include optical switches, cross-connects, Asynchronous Transfer Mode (ATM) switches, SONET/SDH nodes, etc., each including a switching component and multiple line interfaces to interconnect to other nodes 102, such as in the topology of FIG. 1. For example, the switching component can include an optical, an electrical, or a combined optical/electrical switch matrix. The line interfaces can include optical transceivers configured to transmit/receive signals over an optical fiber through DWDM components or the like.

In describing the exemplary embodiments herein, reference is made to OSRP paths, links, legs, and lines. OSRP is a distributed protocol designed for controlling a network of optical cross-connects (OXCs). OSRP introduces intelligence in the control plane of an optical transport system. It can perform many functions such as automatic resource discovery, distributing network resource information, establishing and restoring connections dynamically across the network, and the like. However, the present invention is not limited to OSRP or to optical cross-connects. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

In FIG. 1a, two SNCs (SNC A 104 and SNC B 106) are provisioned terminating at the node 102-4. The SNC A 104 originates at the node 102-1, and the SNC B 106 originates at the node 102-2. SNCs define a grouping of one or more paths that pass through the nodes 102 in the network 100. The signaling and routing protocol (e.g., OSRP) is used to route, establish, and maintain one or more sub-network connections in a given node 102. The SNCs are characterized as path-based or composite. Path-based SNCs can include one or more synchronous transport signals (STS-1). A composite SNC can include multiple paths. SNCs define a temporary (e.g., over a short period of time, where the connection is set-up and torn down at each call) allocation of resources in the network 100. SNCs are provisioned when a call is made.

The routing for a SNC can be explicitly or automatically defined. Provisioning of SNCs is provided through the signaling and routing protocol (e.g., OSRP). Explicitly provisioned SNCs include user (e.g., system administrator)-defined routes. Automatically provisioned SNCs make use of the routing protocol for computing an optimal route. In either case, the route information is transmitted to the nodes 102 in the network 100 and cross-connects associated with the routes are configured. The SNCs are said to be temporary in that, resources associated with the route (e.g., bandwidth) can be dynamically re-allocated along the path. The reconfiguration includes the clearing of the set up connection (e.g., freeing the resources at a given network element).

Network resources associated with the SNCs are dynamically reconfigurable. Accordingly, the failure at a single point along the path from an ingress node to an egress node defining the route will not result in unused and unavailable resources. In one exemplary implementation, a user can configure one or more of the following parameters associated with an SNC including a local line on which the SNC originates, the identification (ID) of the node on which the SNC terminates, the ID of the remote line on which the SNC terminates, a class of service, a maximum allowable delay, route setting including working and protection routes, preferred status, mesh restorability, revert configurations upon fail over and reversion timers.

Advantageously, a user does not have to provision individual Connection Termination Points (CTPs) and cross-connects on each hop (i.e., link) of the connection. SNCs can have different levels of service class and different levels of restoration priority. High-priority SNCs are given preferential treatment during restoration. The first route taken by an SNC once it is unlocked is set as is home route. The route that the SNC is using at any point in time is defined as its current route. Periodically, the originating node can compute a protect path for the SNC to make it maximally failure disjoint from the current route. After a failure clears on an SNC's home route, the SNCs can automatically or manually revert from the current route to the home route. Also, SNCs can be rerouted on to a more optimal route through the network 100 using regrooming functionality.

OSRP provides route selection through a computation performed at the ingress nodes 102-1, 102-2. For example, route selection can be optimized using Dijkstra's Algorithm which can find a shortest path from the ingress nodes 102-1, 102-2 to the egress node 102-4 through the network 100 based on a least administrative cost or weight, subject to a set of user-defined constraints. For example, routing considerations can include link capacity, connection type, line/path protection, restoration priority, explicit routes, maximum delay, reversion, connection preemption, transit delay, and the like.

In a network managed at high utilization, i.e. multiple nodes 102, multiple SNCs, etc., various failure scenarios can lead to a sizeable portion of SNCs with high restoration times. The high restoration times are based on the amount of SNC churn until all SNCs finally restore. SNC churn can also occur due to separate nodes 102 trying to use the same, spare bandwidth at the same time. For example, each node 102 sees the same bandwidth and "assumes" it is available for use.

FIGS. 1a-1d illustrate an example of SNC churn in conventional mesh networks. In FIG. 1a, the two SNCs 104, 106 are operating between the nodes 102-1, 102-2 and the node 102-4 until a failure 108 disrupts a link between the nodes 102-3, 102-4 affecting both the SNCs 104, 106. In FIG. 1b, the node 102-1 which originates the SNC 104 performs a recalculation 110 for a path for the SNC 104 determining that it should be restored between nodes 102-1, 102-5, 102-4. Accordingly, the SNC 104 is rerouted along this path leaving an available bandwidth of one unit between the nodes 102-1, 102-5 and no available bandwidth between the nodes 102-5, 102-4.

In FIG. 1c, substantially simultaneously, the node 102-2 also performs a calculation 112 for a path for the SNC 106 determining that it should be restored between nodes 102-2, 102-1, 102-5, 102-4. However, when the SNC 106 is rerouted along this path, the SNC 106 experiences a crankback 112 on the link between the nodes 102-5, 102-4 for lack of bandwidth. Accordingly in FIG. 1d, the node 102-2 performs a recalculation 116 to reroute the SNC 106 along a path defines by the nodes 102-2, 102-6, 102-7, 102-4. This example of churn is illustrate with respect to two SNCs 104, 106, and those of ordinary skill in the art will recognize that as the network 100 scales with nodes 102 and SNCs 104, 106, the churn can be significant. For example, simulations on networks with hundreds of nodes 102 and thousands of SNCs 104, 106 have shown that significant number of restoration attempts can occur before all SNCs 104, 106 are restored responsive to a failure event.

Figure 2A:
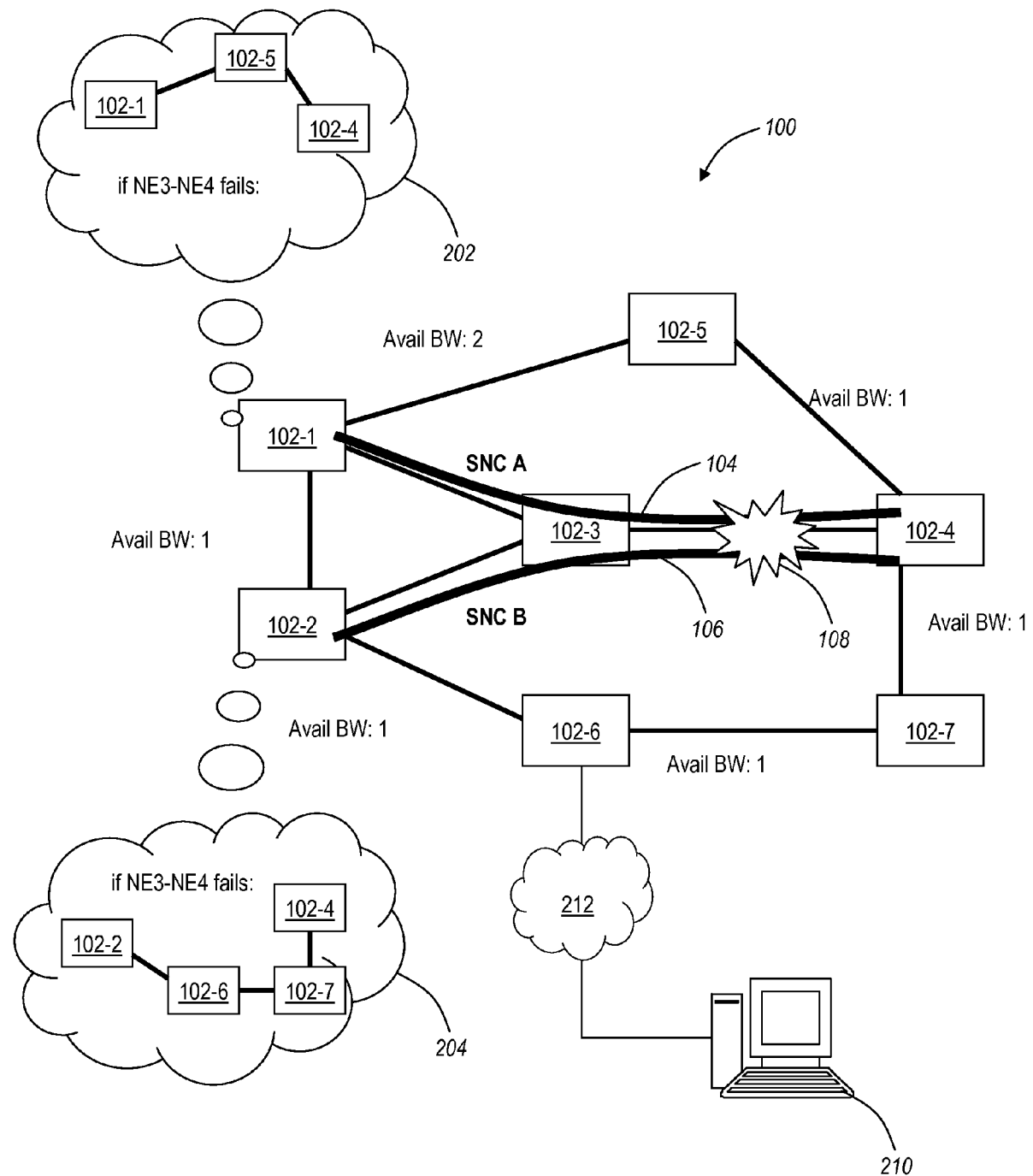
FIGS. 2a-2b illustrate a network with an SNC churn abatement scheme according to an exemplary embodiment of the present invention.
Figure 2B:
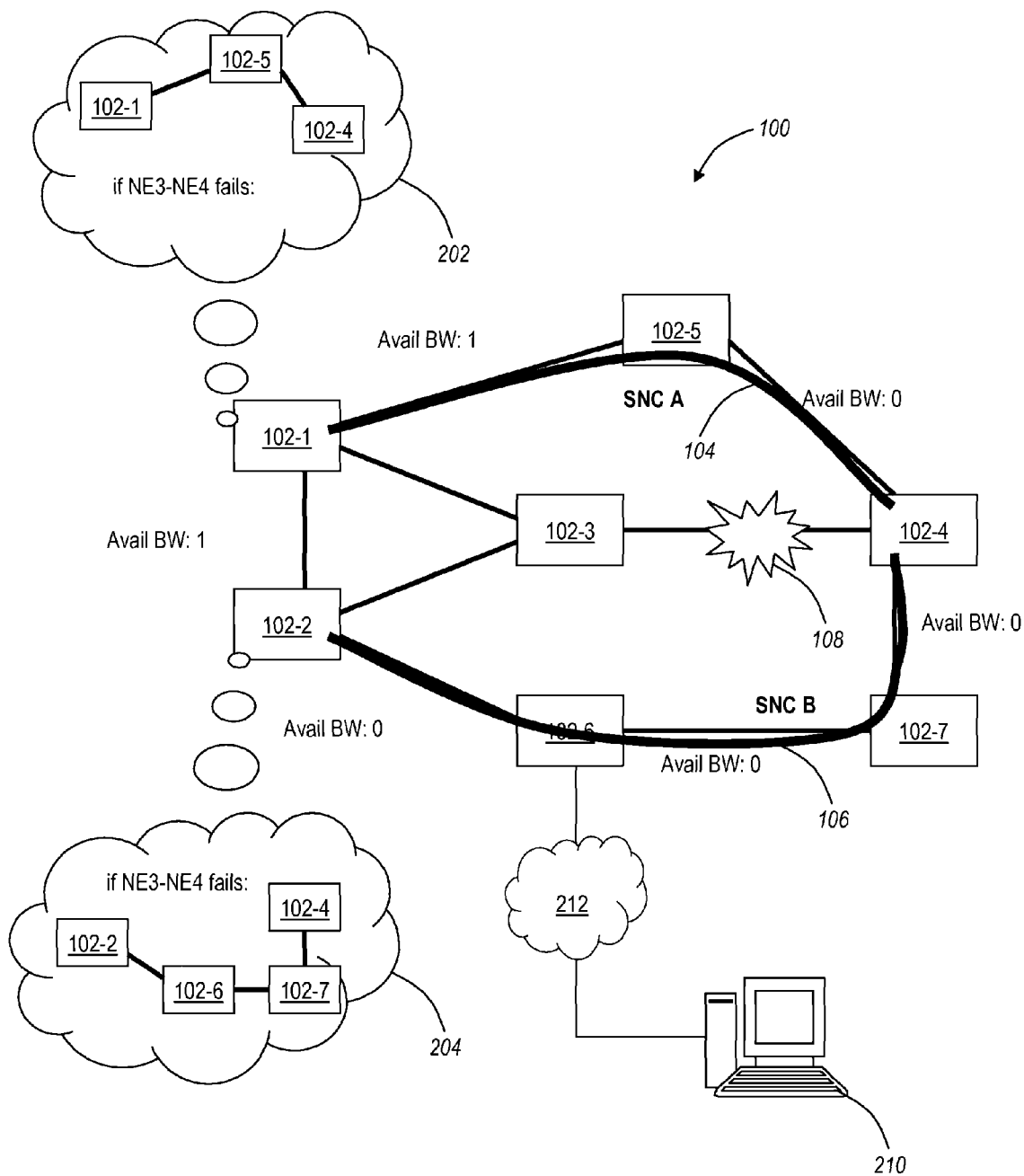

Referring to FIGS. 2a-2b, the network 100 is illustrated with an SNC churn abatement scheme according to an exemplary embodiment of the present invention. In FIG. 2a, similar to FIG. 1a, the SNCs 104, 106 experience the failure 108 between the nodes 102-3, 102-4. However, each of the originating nodes 102-1, 102-2 includes globally correlated restoration paths 202, 204 that lead to SNC churn abatement. In FIG. 2b, the SNCs 104, 106 restore based on their respective globally correlated restoration paths 202, 204 eliminating the crankback 114.

In various exemplary embodiments, the present invention pre-computes several SNC restoration paths based on several failures, for all SNCs that are affected by each failure. Accordingly, for the pre-planned failures, no SNC tries to compete for bandwidth with any other SNC, even for SNCs originating on separate nodes. This can be done for several problematic failure scenarios or even for all possible failure scenarios in the network 100.

The pre-computation of the SNC restoration paths is periodically performed on a management system 210 which communicates to the nodes 102 through a data communication network (DCN) 212. The management system 210 can include a network management system (NMS), element management system (EMS), or the like which is configured to provide operations, administration, maintenance, and provisioning (OAM&P) functionality to the nodes 102. The various SNC restoration paths are stored in each SNC's originating node 102 as a manual DTL. Whenever a failure occurs, the failure information that is communicated to the originating node 102 is used to pick the restoration path to use, i.e., the globally correlated restoration paths 202, 204.

When a failure occurs, the node 102-3, 102-4 next to the failure 108 releases each SNC 104, 106 that is failing with an indication of the OSRP link where the failure 108 occurred. Only the link is indicated, as opposed to an entire bundle. However, each link is assigned a set of protection bundle IDs which identified shared risk elements in the network. Upon receiving a specific link failure, Nodes 102-3, 102-4 make a worst case assumption that the set of all links in the network with a common protection bundle ID have failed.

Current activities at the originating nodes 102-1, 102-2 include inserting the failing link ID into the SNC's blocked bundle list and all OSRP links with at least one protection bundle ID in common with that link are blocked, i.e., no restoration attempt for that SNC will try to use any of those links, at least, until backoff. The rationale for this is upon restoration, any originating node 102-1, 102-2 is not sure if a whole protection bundle is failing, and if so which one among those that the link traverses. Conservatively, for each SNC the node 102 avoids all the links that may be failing at the same time due to a bundle failure that involves the one OSRP link that is known to have failed.

As currently done by each node 102 independently, the conservative assumption for restoration is to assume that none of the bandwidth that may be failing at the same time as one failed OSRP link can be used. In the SNC churn abatement (SCA) scheme of the present invention, the difference is that all restoration paths for all the SNCs that may need restoration at the same time are correlated across the entire network 100. It is similar to a "reserved mesh", where unused bandwidth is assigned for restoration of SNC(s) in such a way that: no two SNCs that may fail at the same time (because of a single bundle failure) are going to compete for the same unused bandwidth; and any two SNCs that can never fail at the same time (no single bundle failure can affect them both) can be assigned the same unused bandwidth for their restoration. In an ideal case no competition for bandwidth is going to arise among SNCs. For each SNC (premium in particular, possibly basic as well in terms of service class), the originating node 102-1, 102-2 stores one pre-computed manual DTL per OSRP link that the SNC 104, 106 uses along its current route; the failing link ID is used for selecting which pre-computed manual DTL is used on first restoration attempt.

Figure 3:
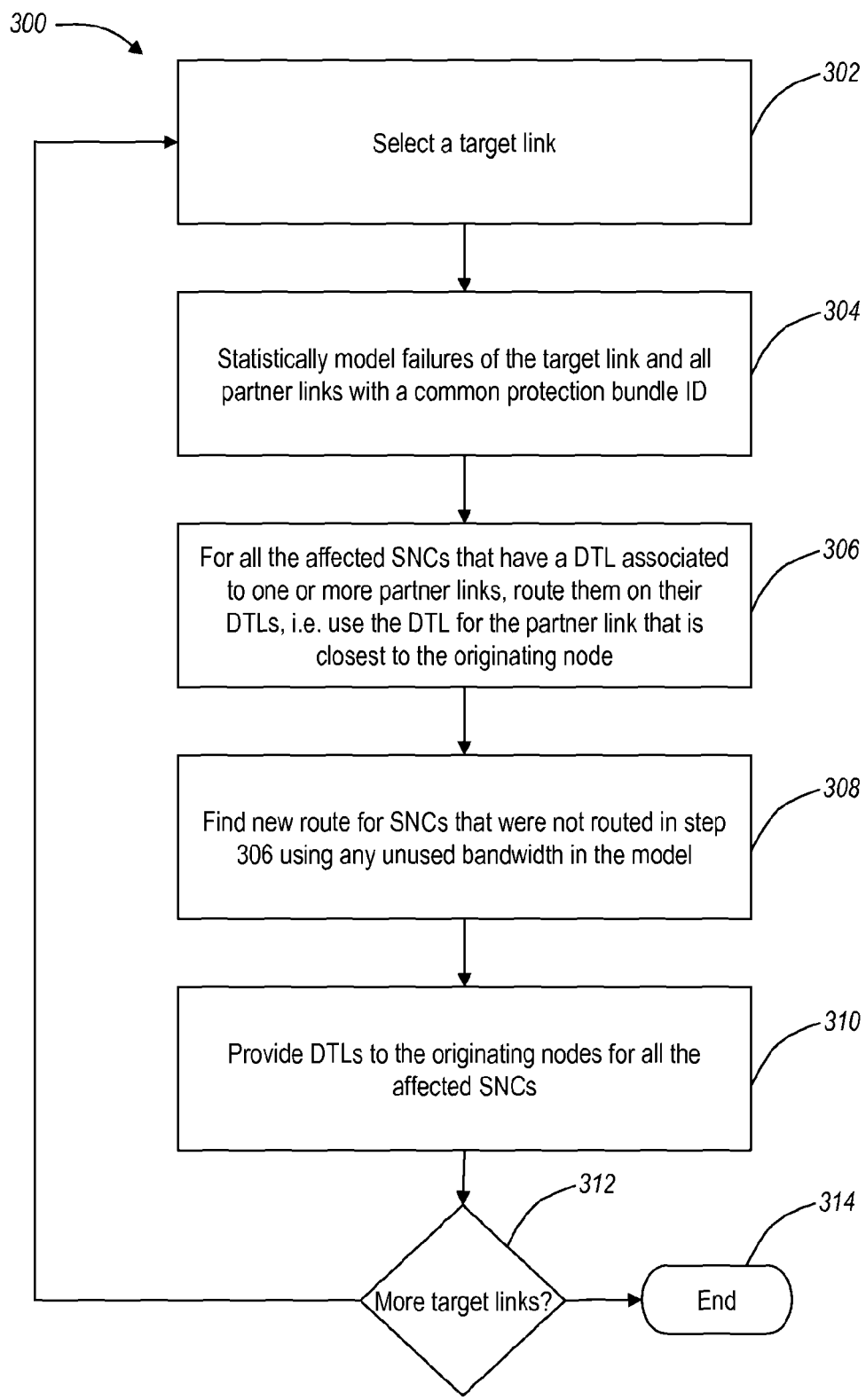
FIG. 3 illustrates a flowchart of pre-computation of manual Designated Transit Lists (DTLs) according to an exemplary embodiment of the present invention.

Referring to FIG. 3, a flowchart illustrates pre-computation 300 of manual DTLs according to an exemplary embodiment of the present invention. As described herein, the pre-computation 300 is performed in an off-line manner, i.e. not in real-time, at a central controller that has a global network view. Here, the central controller includes all nodes, links, SNCs, bundles, etc. in the network. Accordingly, the pre-computation 300 can be globally correlated in calculating the manual (Associated Hop) DTLs, and not isolated to a single node.

The pre-computation 300 includes multiple steps and in each step, the pre-computation 300 focuses on one target OSRP link with the aim to find restoration paths (i.e., manual DTLs) for those SNCs (i.e., referred to as target SNCs) that traverse the target link, to be used in any case of failure of the target link. First, the pre-computation 300 selects a target link (step 302). The pre-computation 300 statically models failures of the target link and of all the OSRP links (i.e., referred to as partner links) with a common protection bundle ID (step 304).

SNCs on all partner links need restoration as well, on a model where target and partner links are all blocked. For all the affected SNCs that already have a DTL associated to one or more of the partner links (due to computations from previous iterations of the pre-computation 300), route them on their DTLs, i.e., use the DTL for the partner link that is closest to the originating node (step 306). A new route is found for SNCs that were not routed already at step 306 using any unused bandwidth in the model (step 308). The manual DTLs are provided to the originating nodes for all the affected SNCs (step 310). The restoration path taken by target SNCs is their new DTL, to be used when restoration is required and the target link is reported failed. If there are more target links for the pre-computation 300 (step 312), then the pre-computation 300 returns to step 302 to select another target link, otherwise the pre-computation 300 ends (step 314).

Some corner cases may arise during the pre-computation 300. For example, these can include a) when a target SNC already has a DTL associated to a partner link, b) some target SNCs cannot find a route, and c) SNCs that never actually fail together due to single bundle failures are modeled as failing (and restored) at the same time. For case a), at any iteration of the pre-computation 300 (besides the first iteration), it is possible that some target SNCs already have a DTL for one of the partner links to fail. Depending on how close to the originating node they are, in an actual single bundle failure case either the target link's or the partner link's DTL are selected. The pre-computation 300 can choose only one or can choose both (to be conservative). However, choosing both reduces the bandwidth available to the pre-computation 300 for other links. In an exemplary embodiment, the pre-computation can just utilize the previously determined DTL.

For case b), some target links include a considerable number of protection bundles that need to be modeled as failing at the same time (e.g., up to 20), with each bundle potentially being composed of several OSRP links. A considerable amount of bandwidth is accordingly removed from the network model, which would not all be unavailable at the same time in single bundle failure cases. It is possible that not all the target SNCs find a restoration path. With no manual DTL associated to the target link, in a single bundle failure that involves the link an SNC follows the current behavior. However, the SNC may restore on bandwidth assigned to other SNCs, which in turn may crankback thus cascading to cause other SNCs to crankback. Optionally, the pre-computation 300 can after routing each target link, run through a second phase to try and route the unrouted SNCs also on partner links. If a path is found, when the target link fails, these SNCs try to go on partner links—in certain single bundle failure cases these links may fail at the same time as the target link, thus causing the SNC to crankback; however, in some other cases the restoration path may be fully usable and may be better than on-the-fly computation, also reducing the likelihood of cascading crankbacks.

For case c), because of the layout of protection bundles, it is possible that two SNCs that would never be failing at the same time (and which share some bandwidth for restoration) end up being modeled as routing at the same time in the computation. Accordingly, restoration bandwidth may be accounted for twice, thus reducing the ability to find restoration paths.

Figure 4:
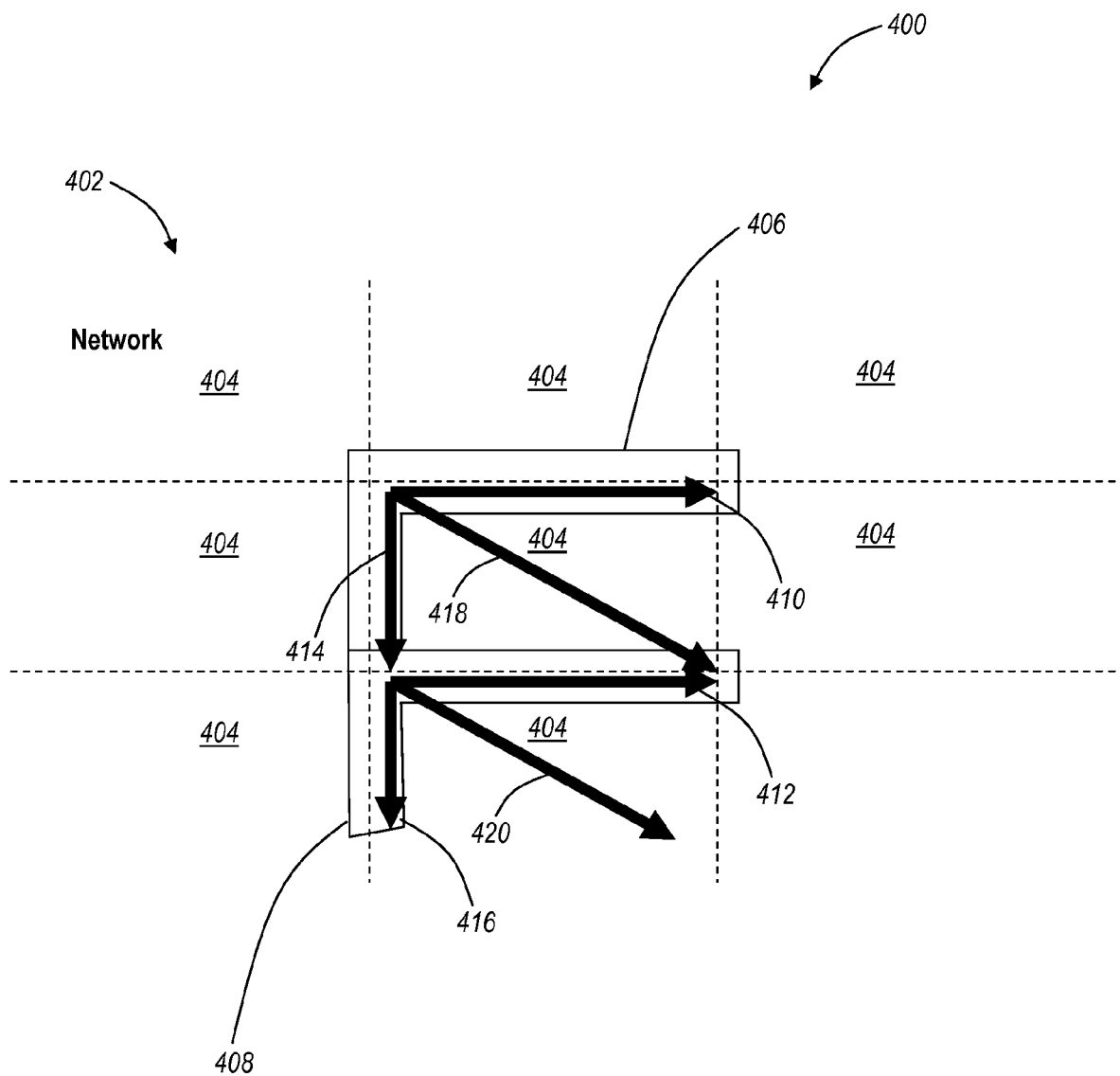
FIG. 4 illustrates parallelization of the pre-computation of FIG. 3 according to an exemplary embodiment of the present invention.

Referring to FIG. 4, parallelization 400 of the pre-computation 300 is illustrated according to an exemplary embodiment of the present invention. As networks grow utilizing the pre-computation 300, the pre-computation 300 may encounter scalability concerns. The parallelization 400 can provide a more efficient implementation of the pre-computation 300. The parallelization 400 partitions a network 402 of a set of OSRP links into conceptual sectors 404. The computation on links in different sectors 404 can be assigned to different machines; each machine has an identical copy of the network model. For example, a machine can be a processor or the like. The machines need to share DTLs for links in different sectors 404 that have at least one protection bundle 406, 408 in common. When a machine is going to process one target link that shares protection bundles 406, 408 with links in another sector, the machine communicates its intention to the other machine to indicate that DTLs are going to be generated and arbitration is necessary. The set of links that each machine handles can be sorted to minimize collision of computations and waiting. For example, links 410, 412 can be computed first, links 414, 416 can be computed second, and links 418, 420 computed last.

Figure 5:
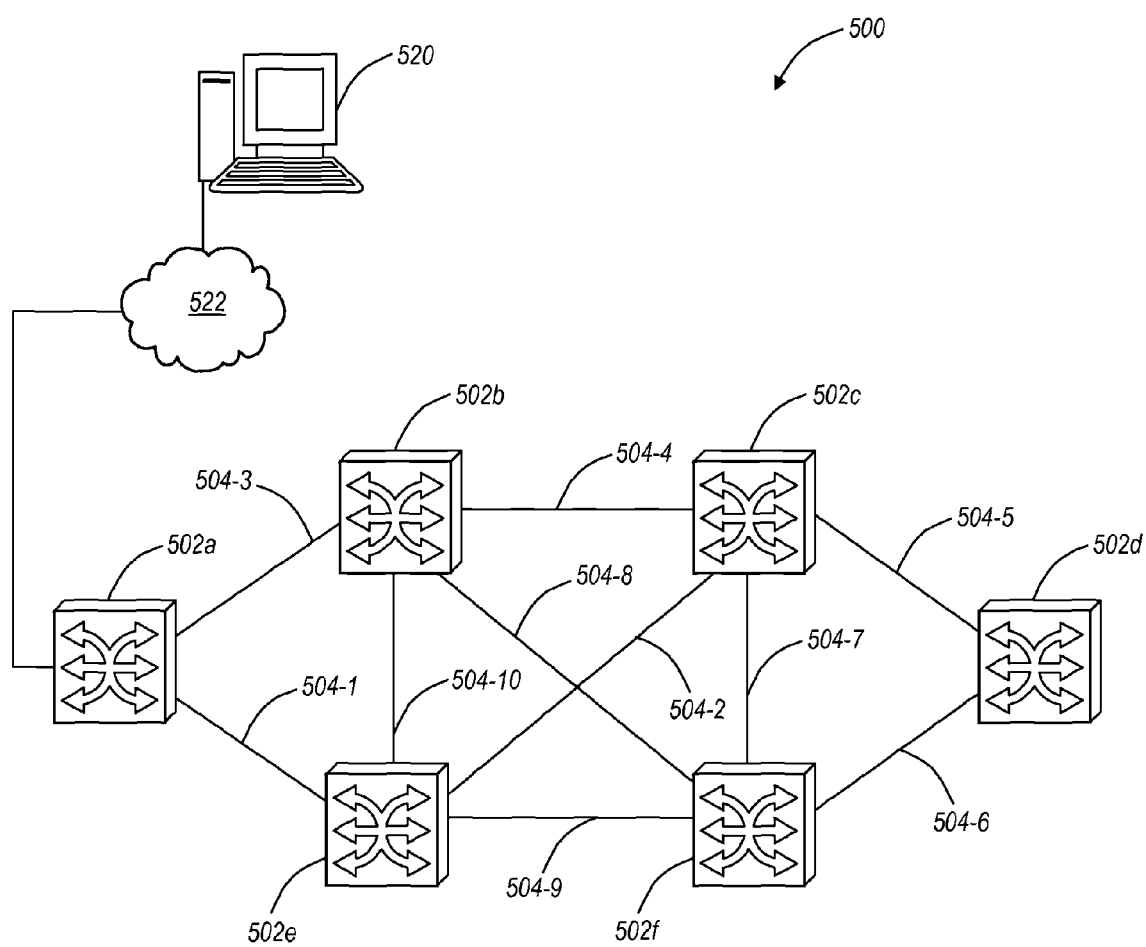
FIG. 5 illustrates a network with a plurality of interconnected nodes with pre-computed Associated Hop DTLs according to an exemplary embodiment of the present invention.

Referring to FIG. 5, a network 500 with a plurality of interconnected nodes 502*a-f* illustrates pre-computed Associated Hop DTLs according to an exemplary embodiment of the present invention. The network 500 includes a plurality of links 504-1-504-10 interconnecting each of the nodes 502*a-f*. For illustrative purposes, node 502*a* is the originating node and 502*d* is the terminating node of an SNC connection. Assume the home path or current working path for the SNC is {link 504-3, link 504-4, link 504-5}. The pre-computation 300 can be computed with respect to the SNC and the links it traverses. For example, a result from the pre-computation 300 can include DTL Associated Hops specified as {link 504-3}=>{node 502*a*, link 504-1; node 502*e*, link 504-9; node 502*f*, link 504-6}, {link 504-4}=>{node 502*a*, link 504-3; node 502*b* link 504-8; node 502*f*, link 504-6}, and {link 504-5}=>{node 502*a*, link 504-1, node 502*e*, link 504-10, node 502*b*, link 504-8; node 502*f*, link 504-6}. A protect route can be computed for a High Priority SNC as {node 502*a*, link 504-1; node 502*e*, link 504-9; node 502*f*, link 504-6}.

As described herein, existing behavior suffers from an issue that if a protect path or a Non-Hop protect DTL overlaps with the work path's bundle ID (even though link may not be part of that failure), this results in that path getting discarded during mesh restoration based on bundle ID diversity. The present invention addresses this problem along with a software support for a look up on the failed link from the release message to retrieve a protect path from the configured DTL Set on that SNC for faster mesh performance.

Figure 6:
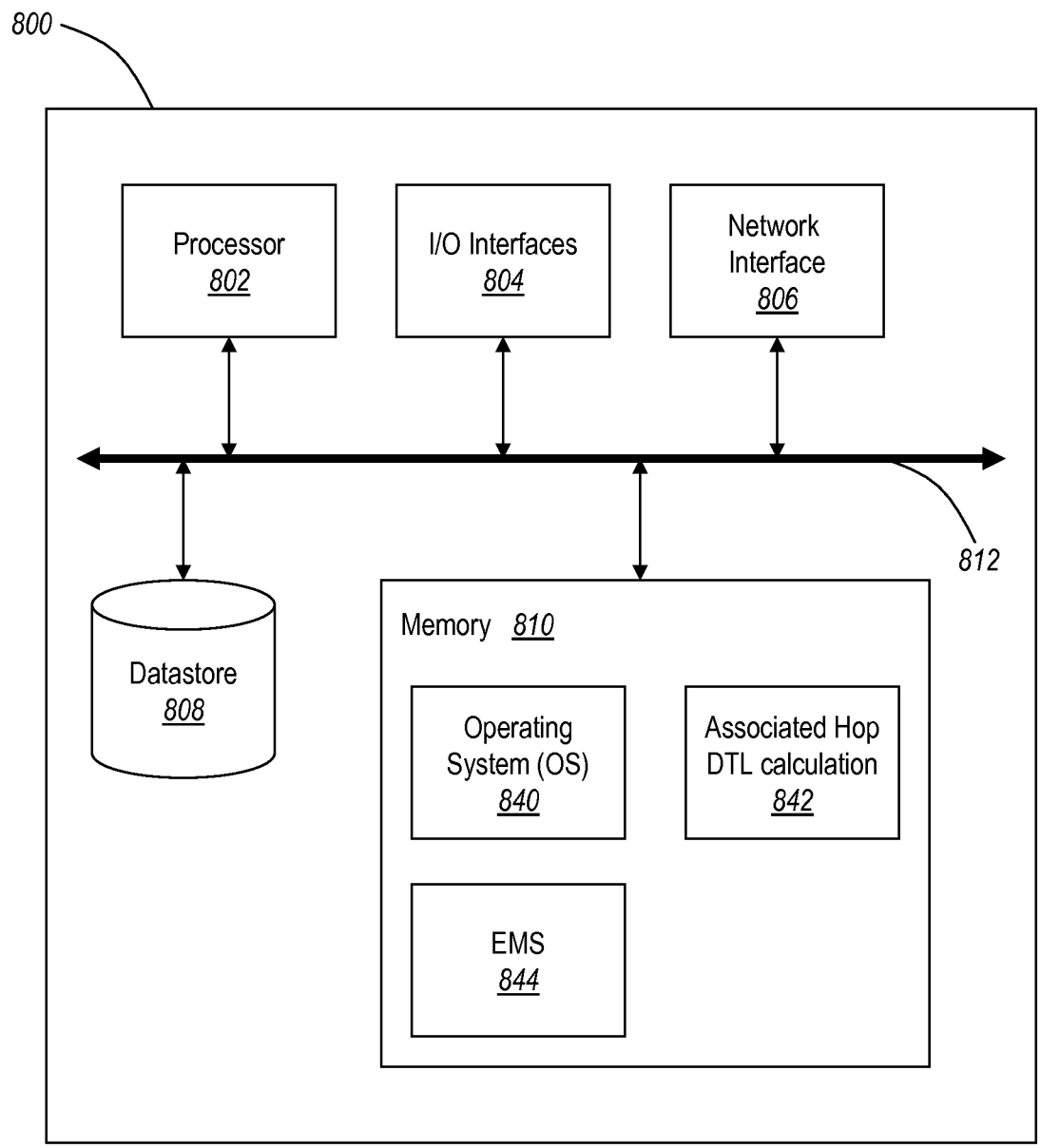
FIG. 6 illustrates a block diagram of a server/controller for pre-computation of Associated Hop DTLs according to an exemplary embodiment of the present invention.

Referring to FIG. 6, a block diagram illustrates a server/controller 800 for pre-computation of Associated Hop DTLs according to an exemplary embodiment of the present invention. The server/controller 800 can be a digital computer that, in terms of hardware architecture, generally includes a processor 802, input/output (I/O) interfaces 804, network interfaces 806, memory 810, and a data store 808. The components (802, 804, 806, 808, and 810) are communicatively coupled via a local interface 812. The local interface 812 can be, for example but not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 can include address, control, and/or data connections to enable appropriate communications among the aforementioned components.

The processor 802 is a hardware device for executing software instructions. The processor 802 can be any custom made or commercially available processor, a central processing unit (CPU), an auxiliary processor among several processors associated with the server/controller 800, a semiconductor-based microprocessor (in the form of a microchip or chip set), or generally any device for executing software instructions. When the server/controller 800 is in operation, the processor 802 is configured to execute software stored within the memory 810, to communicate data to and from the memory 810, and to generally control operations of the server/controller 800 pursuant to the software instructions.

The I/O interfaces 804 can be used to receive user input from and/or for providing system output to one or more devices or components. User input can be provided via, for example, a keyboard and/or a mouse. System output can be provided via a display device and a printer (not shown). I/O interfaces 804 can include, for example, a serial port, a parallel port, a small computer system interface (SCSI), an infrared (IR) interface, a radio frequency (RF) interface, and/or a universal serial bus (USB) interface. If the server/controller 800 is a controller in a network element, the I/O interfaces 804 can include a backplane, midplane, etc. connection to communicate with various modules within the network element.

The network interfaces 806 can be used to enable the server/controller 800 to communicate on a network. For example, the server/controller 800 can utilize the network interfaces 806 to communicate to network elements, other EMS/NMS systems, and the like. Each network element can include a network interface to communicate to the server/controller 800 for operations, administration, maintenance, and provisioning (OAM&P). Alternatively, one or more network elements can connect to the network interfaces 806 with the one or more network elements providing access to the server/controller 800 through various mechanisms, such as an optical service channel (OSC), overhead bytes, and the like. The network interfaces 806 can include, for example, an Ethernet card (e.g., 10 BaseT, Fast Ethernet, Gigabit Ethernet) or a wireless local area network (WLAN) card (e.g., 802.11a/b/g/n). The network interfaces 806 can include address, control, and/or data connections to enable appropriate communications on the network.

A data store 808 can be used to store data, such as network topology, provisioned links, etc. The data store 808 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 can incorporate electronic, magnetic, optical, and/or other types of storage media. In one example, the data store 808 can be located internal to the server/controller 800 such as, for example, an internal hard drive connected to the local interface 812 in the server/controller 800.

The memory 810 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 may incorporate electronic, magnetic, optical, and/or other types of storage media. Note that the memory 810 can have a distributed architecture, where various components are situated remotely from one another, but can be accessed by the processor 802.

The software in memory 810 can include one or more software programs, each of which includes an ordered listing of executable instructions for implementing logical functions. In the example of FIG. 8, the software in the memory system 810 includes a suitable operating system (O/S) 840, an Associated Hop DTL calculation program 842, and an EMS program 844. The operating system 840 essentially controls the execution of other computer programs, such as the Associated Hop DTL calculation program 842 and the EMS program 844, and provides scheduling, input-output control, file and data management, memory management, and communication control and related services. The operating system 840 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

The server/controller 800 can operate as an EMS, NMS, or the like operable to manage network elements in a network. For example, the server/controller 800 can include the EMS program 844 loaded in the memory 810. The EMS program 844 can provide OAM&P access to a plurality of network elements in a mesh network. The server/controller 800 can include multiple EMS programs 844 to allow OAM&P access to multiple NE types. Alternatively, the server/controller 800 can operate as a network element controller configured to manage a single network element for OAM&P access.

In an exemplary embodiment of the present invention, the Associated Hop DTL calculation program 842 is included on the server/controller 800. Specifically, the Associated Hop DTL calculation program 842 is configured to maintain a network topology and to periodically pre-calculate Associated Hop DTLs for each bundle failure in a network, e.g., such as described in FIG. 3. It is an issue to pre-calculate DTLs for each bundle failure in a network and to continuously update the network with the calculation. Specifically, this is difficult to do in real-time based on the complexities associated with the pre-calculation.

In an exemplary embodiment, the Associated Hop DTL calculation program 842 performs an initial pre-calculation for the entire network and pushes this baseline down to all network elements. For example, this baseline could occur on an order of once a day or some other periodic interval. As circuits are added/deleted due to provisioning or failure events, the Associated Hop DTL calculation program 842 can perform a new calculation for each bundle whose bandwidth has changed. Here, the server/controller 800 is receiving bandwidth change notifications from each network element as part of normal operation. This could be done on the order of every five to fifteen minutes or in direct response to changes.

As a result of BW changes in the network, the DTLs for SNCs that are not associated with any bundle failure can also need to be updated. For example, an SNC can have a DTL that calls out for it to use a hop that is currently failed. Since Associated Hop DTL calculation program 842 calculated the DTLs in the first place, it could also recalculate any bundles that have DTLs that make use of them. For example, if a DTL calls out a link for which bandwidth has changed, the Associated Hop DTL calculation program 842 could correlate this to the bundles which try to use it if they fail.

Given the latency associated with these calculations, the network element can also rely on bandwidth advertisements from the network to validate its current DTLs. For example, if the network element has a DTL for which the network indicates the bandwidth is zero; it could mark that DTL as invalid and rely on its own pre-computed path.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A mesh restoration method comprising:

selecting a target link from a plurality of links in an optical network, the optical network utilizing a signaling and routing protocol;

modeling failures on the target link and all partner links of the plurality of links with a common protection bundle identification, wherein the failures affect a plurality of sub-network connections traversing the target link and the partner links, each of the sub-network connections comprises call-initiated allocations of dedicated network resources in the optical network;

determining pre-computed restoration paths based on the failures for each of the affected plurality of sub-network connections;

providing the pre-computed restoration paths to an originating node in form of Associated Hop Designated Transit Lists for each of the pre-computed restoration paths;

routing, using the signaling and routing protocol, data of the affected plurality of sub-network connections along the pre-computed restoration paths on a per sub-network connection basis in accordance with the Associated Hop Designated Transit Lists;

determining a plurality of sectors each comprising a portion of a total number of the plurality of links;

repeating said selecting, said modeling, said determining, and said providing for each of the plurality of links by using a parallel computation based on the plurality of sectors; and assigning, to a plurality of machines, the parallel computation on the portion of the total number of the plurality of links in the plurality of sectors;

the plurality of machines having identical copies of a network model of the optical network;

the parallel computation comprising:

sharing, among the plurality of the machines, the Associated Hop Designated Transit Lists for links of the plurality of sectors having a common protection bundle;

communicating, among the plurality of machines, an indication indicating a generation of the Associated Hop Designated Transit Lists and a required arbitration;

and sorting a set of links handled, by each of the plurality of machines for parallel computation, in a manner to minimize computation collisions.

2. The mesh restoration method of claim 1, wherein the routing step further comprises:

for all remaining sub-network connections, finding a new route using any unused bandwidth in the network.

3. The mesh restoration method of claim 1, wherein repeating provides an initial base line and is responsive to provisioning or failure events on one or more of the plurality of links; and further comprising:

updating the initial baseline periodically.

4. The mesh restoration method of claim 1, further comprising: receiving updates from a plurality of nodes in the network with the signal and routing protocol;

wherein the updates are utilized in the selecting, statistically modeling, determining, and providing.

5. An optical network, comprising:

one or more originating nodes;

one or more terminating nodes interconnected to the one or more originating nodes through a plurality of optical links, the optical network utilizing a signaling and routing protocol; and a controller in communication with each of the one or more originating nodes and the one or more terminating nodes;

wherein the controller is configured to:

select a target link from the plurality of links;

model failures on the target link and all partner links of the plurality of links with a common protection bundle identification, wherein the failures affect a plurality of sub-network connections traversing the target link and the partner links, each of the sub-network connections comprises call-initiated allocations of dedicated network resources in the optical network;

determine pre-computed restoration paths based on the failures for each of the affected plurality of sub-network connections;

provide the pre-computed restoration paths to the one or more originating nodes in form of Associated Hop Designated Transit Lists for each of the pre-computed restoration paths;

route, using the signaling and routing protocol, data of the affected plurality of sub-network connections along the pre-computed restoration paths on a per-sub-network connection basis in accordance with the Associated Hop Designated Transit Lists;

determine a plurality of sectors each comprising a portion of a total number of the plurality of links;

repeat said selecting, said modeling, said determining, and said providing for each of the plurality of links by using a parallel computation based on the plurality of sectors; and assign, to a plurality of machines, the parallel computation on the portion of the total number of the plurality of links in the plurality of sectors;

the plurality of machines having identical copies of a network model of the optical network;

the parallel computation comprising:

sharing, among the plurality of the machines, the Associated Hop Designated Transit Lists for links of the plurality of sectors having a common protection bundle;

communicating, among the plurality of machines, an indication indicating a generation of the Associated Hop Designated Transit Lists and a required arbitration;

and sorting a set of links handled, by each of the plurality of machines for parallel computation, in a manner to minimize computation collisions.

6. The mesh network of claim 5, wherein the controller is further configured to, for all remaining sub-network connections, find a new route using any unused bandwidth in the mesh network.

7. The mesh network of claim 5, wherein the controller is further configured to determine the pre-computed restoration paths based on one of provisioning and failure events.

8. The mesh network of claim 5, wherein the controller is further configured to receive updates from the one or more originating nodes and the one or more terminating nodes.

9. A management system for a mesh network, comprising:

a data store;

a memory;

a processor;

a network interface communicatively coupled to one or more nodes in the mesh network; and a local interface communicatively coupling each of the data store, the memory, the processor, and the network interface;

wherein the processor is configured to:

select a target link from a plurality of links in an optical network, the optical network utilizing a signaling and routing protocol;

model failures on the target link and all partner links of the plurality of links with a common protection bundle, wherein the failures affect a plurality of sub-network connections traversing the target link and at least one link in the common protection bundle, each of the sub-network connections comprises call-initiated allocations of dedicated network resources in the optical network;

determine pre-computed restoration paths based on the failures for each of the affected plurality of sub-network connections;

provide the pre-computed restoration paths to the one or more nodes in form of Associated Hop Designated Transit Lists for each of the pre-computed restoration paths;

route, using the signaling and routing protocol, data of the affected plurality of sub-network connections along the pre-computed restoration paths on a per-sub-network connection basis in accordance with the Associated Hop Designated Transit Lists;

determine a plurality of sectors each comprising a portion of a total number of the plurality of links;

repeat the selecting, the modeling, the determining, and the providing for each of the plurality of links by using a parallel computation based on the plurality of sectors; and assign, to a plurality of machines, the parallel computation on the portion of the total number of the plurality of links in the plurality of sectors;

the plurality of machines having identical copies of a network model of the optical network;

the parallel computation comprising:

sharing, among the plurality of the machines, the Associated Hop Designated Transit Lists for links of the plurality of sectors having a common protection bundle;

communicating, among the plurality of machines, an indication indicating a generation of the Associated Hop Designated Transit Lists and a required arbitration;

and sorting a set of links handled, by each of the plurality of machines for parallel computation, in a manner to minimize computation collisions.

10. The management system of claim 9, wherein the one or more nodes include one or more originating nodes and the processor is further configured to update the one or more originating nodes with the pre-computed restoration paths.

11. The management system of claim 10, wherein the processor further configured to determine the pre-computed restoration paths based on one of provisioning and failure events.

12. The mesh restoration method of claim 1, wherein the signaling and routing protocol comprises one of Automatically Switched Optical Network (ASON) and Optical Signal and Routing Protocol (OSRP).

* * * * *